US006776714B2

(12) United States Patent
Ungaro et al.

(10) Patent No.: US 6,776,714 B2
(45) Date of Patent: Aug. 17, 2004

(54) PROGRESSIVE ROULETTE

(75) Inventors: Mark Curran Ungaro, 2144 Tona Cir., Las Vegas, NV (US) 89109; Carlo Palombo, Las Vegas, NV (US)

(73) Assignee: Mark Curran Ungaro, Las Vegas, NV (US)

( * ) Notice: Subject to any disclaimer, the term of this patent is extended or adjusted under 35 U.S.C. 154(b) by 18 days.

(21) Appl. No.: 09/799,889

(22) Filed: Mar. 7, 2001

(65) Prior Publication Data

US 2003/0036426 A1 Feb. 20, 2003

Related U.S. Application Data

(60) Provisional application No. 60/196,113, filed on Apr. 11, 2000.

(51) Int. Cl.[7] .......................... A63F 13/00; A63F 9/24; G06F 17/00; G06F 19/00

(52) U.S. Cl. ............................ 463/27; 463/13; 463/16; 463/17; 463/18; 463/19; 463/25; 463/26; 463/46; 273/138.1; 273/268; 273/274; 273/283; 273/309

(58) Field of Search .............................. 463/27, 10–13, 463/16, 17, 18, 19, 20, 21, 22, 25, 26, 28, 29, 46, 47; 273/274, 236, 142 R, 148 R, 141 R, 309, 162 E, 138.1, 142 F, 283, 242, 243, 268

(56) References Cited

U.S. PATENT DOCUMENTS

| | | | | | |
|---|---|---|---|---|---|
| 4,396,193 | A | * | 8/1983 | Reinhardt et al. | 273/142 B |
| 4,467,424 | A | * | 8/1984 | Hedges et al. | 340/323 R |
| 4,560,171 | A | * | 12/1985 | Anthony | 273/269 |
| 4,861,041 | A | * | 8/1989 | Jones et al. | 273/292 |
| 5,042,810 | A | * | 8/1991 | Williams | 273/143 R |
| 5,092,598 | A | * | 3/1992 | Kamille | 273/139 |
| RE34,340 | E | * | 8/1993 | Freeman | 358/86 |
| 5,258,837 | A | * | 11/1993 | Gormley | 348/441 |
| 5,278,643 | A | * | 1/1994 | Takemoto et al. | 348/150 |
| 5,288,081 | A | * | 2/1994 | Breeding | 273/274 |
| 5,605,504 | A | * | 2/1997 | Huang | 463/12 |
| 5,743,708 | A | * | 4/1998 | Cunha et al. | 415/115 |
| 5,801,766 | A | * | 9/1998 | Alden | 273/142 R |
| 6,059,659 | A | * | 5/2000 | Busch et al. | 273/142 B |
| 6,093,100 | A | * | 7/2000 | Singer et al. | 273/292 |
| 6,168,521 | B1 | * | 1/2001 | Luciano et al. | 463/17 |

* cited by examiner

*Primary Examiner*—Teresa Walberg
*Assistant Examiner*—Binh-An D. Nguyen

(57) ABSTRACT

A roulette game utilizing the existing roulette wheel and layout to enhance the game of roulette. Players make wagers on the conventional layout and using the plurality of token acceptors can place an extra wager to win two separate progressive jackpots.

5 Claims, 14 Drawing Sheets

Summarized Legend for Preceding Figures

| | |
|---|---|
| 10 | Roulette Game Board and Layout |
| 14 | Token Acceptor Slot |
| 16 | Roulette Wheel |
| 18 | Large Winning Numbers Display |
| 20 | Player Reset Buttons |
| 24 | Wager Lock-in Button |
| 26 | Enter Spin Result Button |
| 28 | Token or Coin Alley-way |
| 30 | Progressive Jackpot Tower |
| 32 | Progressive Jackpot Drop Box |
| 34 | Tokens or Coins |
| 36 | Token Acceptor light (**Red LED**) |
| 38 | Token Acceptor Hopper |
| 40 | Main Progressive Computer |
| 42 | Data Cable to Main Computer |
| 44 | Conveyor |
| 46 | Progressive Counter |
| 48 | Player Coin Acceptor light (**Amber LED**) |
| 50 | Player Control Panel Ready light (**Green LED**) |
| 52 | Minor Progressive Jackpot Display |
| 54 | Pro-Aggressive Jackpot Display System |
| 56 | LED or LCD Display (Player) |
| 58 | LED or LCD Display (Winning Combination) |
| 60 | Tower Display Unit |
| 62 | Dealer Control Panel |
| 64 | Player Control Panel |
| 66 | Key Pad |
| 68 | Conveyor Belt |
| 70 | Conveyor Motor |
| 72 | Speakers |
| 78 | Slave Air Cylinder |
| 80 | Vacuum Hose to Master Solenoid Control Air Cylinder |
| 82 | Provisional Winner Display |
| 84 | Air Cylinder Plunger |
| 86 | Infra-red sensor (Coin Drop) |
| 88 | Infra-red sensor (Place Bets) |
| 90 | Master Solenoid Control Air Cylinder |
| 92 | 1 to 6 Vacuum Line Splitter |

FIG. 10

PROGRESSIVE ROULETTE

This application claims the benefit of U.S. Provisional Application No. 60/196,113, filed Apr. 11, 2000.

BACKGROUND

The present invention relates to casino table gaming, and more specifically pertains to a system for playing a roulette game including a progressive jackpot and windfall jackpot. Roulette, one of the oldest games in the history of gambling utilizes at odds pay-out system coupled with an existing wheel and number read-out system (that is standard to the industry).

During the course of Roulette play, the players place their chips or tokens on the betting layout located on the roulette table. The croupier or dealer (hereafter referred to as a dealer) spins the wheel to place the game in motion. At the same time the dealer spins the ball in the opposite direction. As the ball slows, it hits the frets located in the wheel head and then lands into a number that is associated with the table layout numbers. The dealer then settles the various wagers in accordance with payouts, odds and predetermined rules.

In theory, the game should include more than the standard betting opportunity during the course of the game. Enhancing the play with a Progressive Jackpot would excite the player's interest and enjoyment with the option of winning a larger payout and involve them with more participation in the game of standard Roulette.

The Progressive Jackpot acceptor slot is known for casino wagering play. U.S. Pat. Nos. 4,861,041 (Jones et al.) and 5,288,081 (Breeding) disclose methods of progressive jackpot gaming, respectfully. Both patents disclose that at the beginning of a hand, the player may make an additional wager.

U.S. Pat. No. 5,042,810, issued to Martin G. Williams on Aug. 27, 1991, discloses a method and apparatus for playing a roulette game including a progressive jackpot.

The apparatus includes a computer that is programmed to detect the ocurrence in a game situation in which a payout of two separate jackpots could occur. A chip counter and sorter counts the wagers placed on the layout and increments the two separate amounts based upon percentages of the layout wager amounts. The first jackpot is paid when the same number occurs or comes up three times in a row. The jackpot is then paid to the player who is playing with the color against which that number is assigned to or allocated. For example, the first jackpot is paid when a number occurs 3 times in a row, and is paid to the player who is playing with the color against which that number is permanently assigned or allocated. I.E. red=1, 6, 14 and 18; blue=2, 7, 15, 19; yellow=3, 89, 20, 30 etc. If no one is playing the assigned color when it hits, then the jackpot continues to be incremented on the jackpot display. Because the chips are different colors, each player can only bet on a portion of the jackpot or game in order to win the progressive jackpot.

U.S. Pat. No. 5,743,798, issued to Terry Allen Adams et al. and assigned to Progressive Games Inc. of Ft. Lauderdale Fla. discloses an apparatus for playing a roulette game including a progressive jackpot. Each player is assigned a token or chip color at his or her position on the table.

The player places the wager on the layout on the appropriate number indicia, on four different spins of the roulette wheel, and if the ball lands in the same pocket on the wheel indicating the same number, four times in a row then the player would win the progressive jackpot. The color and position determines who wins the progressive jackpot. Players win the progressive jackpot by catching the same winning number four times in a row with an assigned color of chip.

U.S. Pat. No. 6,059,659 issued to Steven L. Busch et al. and assigned to Las Vegas, Gaming Inc. Las Vegas discloses a method using a roulette table having progressive jackpots. In the various embodiments of the invention, bets may be placed on either the conventional layout or progressive jackpot betting layout. It is preferred that the players be required to first wager on the conventional layout before wagering on the progressive phase of the game. The player has the option of handing the dealer a chip or token and verbally indicates to the dealer to place the chip or token on the selected number on the progressive jackpot betting layout. If the next spin of the wheel results in the wheel selecting the same progressive jackpot layout number as it did in the previous spin, a fixed cash payout may optionally be awarded to the player who bet on the number. The players have a choice in the progressive jackpot betting layout. To win the progressive jackpot, the player still must wager a complicated layout and roulette system.

SUMMARY OF THE INVENTION

The present invention provides an improved method and apparatus for playing the game of roulette including two different progressive jackpot payouts. The playing of the game Pro-Aggressive Roulette is very simple. The apparatus or device requires minimum change to the layout and no change to the game of roulette. The game of roulette is still played the same, dealt the same, supervised and monitored in the same fashion. The Pro-Aggressive betting action method and system combined with the standard roulette wheel, coin acceptor slots, dealer control panel and sign display allow the player to wager and win one of the Pro-Aggressive Jackpots.

In brief the focus of our game relies upon the player's achieving a three-in-a-row effect similar to tic-tac-toe for the minor progressive or a "basket" win for the major progressive. These are based on the layout of the roulette table, see FIGS. 2_a_–2_d_ for more detail. Our desire is to provide a simple addition to roulette with minimal hindrance to the player or dealer. In order to accomplish this a computer will be used to track each player's held numbers, and to determine payouts. The player's control panel is a simple device designed to convey to the player the status of his token/bet, his currently held numbers, and a slot tor him to enter his token. The dealer's control panel is similar with a display for a winning series, a keypad to enter the results of the spin, reset buttons for each player, and LED's to indicate the status of each player's tokens. Collection of the tokens will be accomplished through the use of a conveyor system. We offer the option to use either credit cards, ATM cards, custom casino system, or the custom player cards used in some casinos as an additional or alternate means of placing a bet. The Pro-Aggressive main computer will be located under each roulette table.

Those skilled in the art will appreciate the conception on which this disclosure is based and may readily be utilized as a basis for this disclosure. It is important therefore, that the claims be regarded as including such equivalent constructions insofar as they do no depart from the spirit and scope of the present invention and method.

BRIEF DESCRIPTION OF DRAWINGS

FIG. #1—is a top view of the standard roulette wheel game and layout depicting where the player control panels are located in front of the players seats, the dealers control panel the progressive jackpot and Pro-Aggressive Jackpot tower.

FIGS. #*2a–2d*—shows examples of the game layout depicting how the progressive jackpots could be won.

Figure 1:
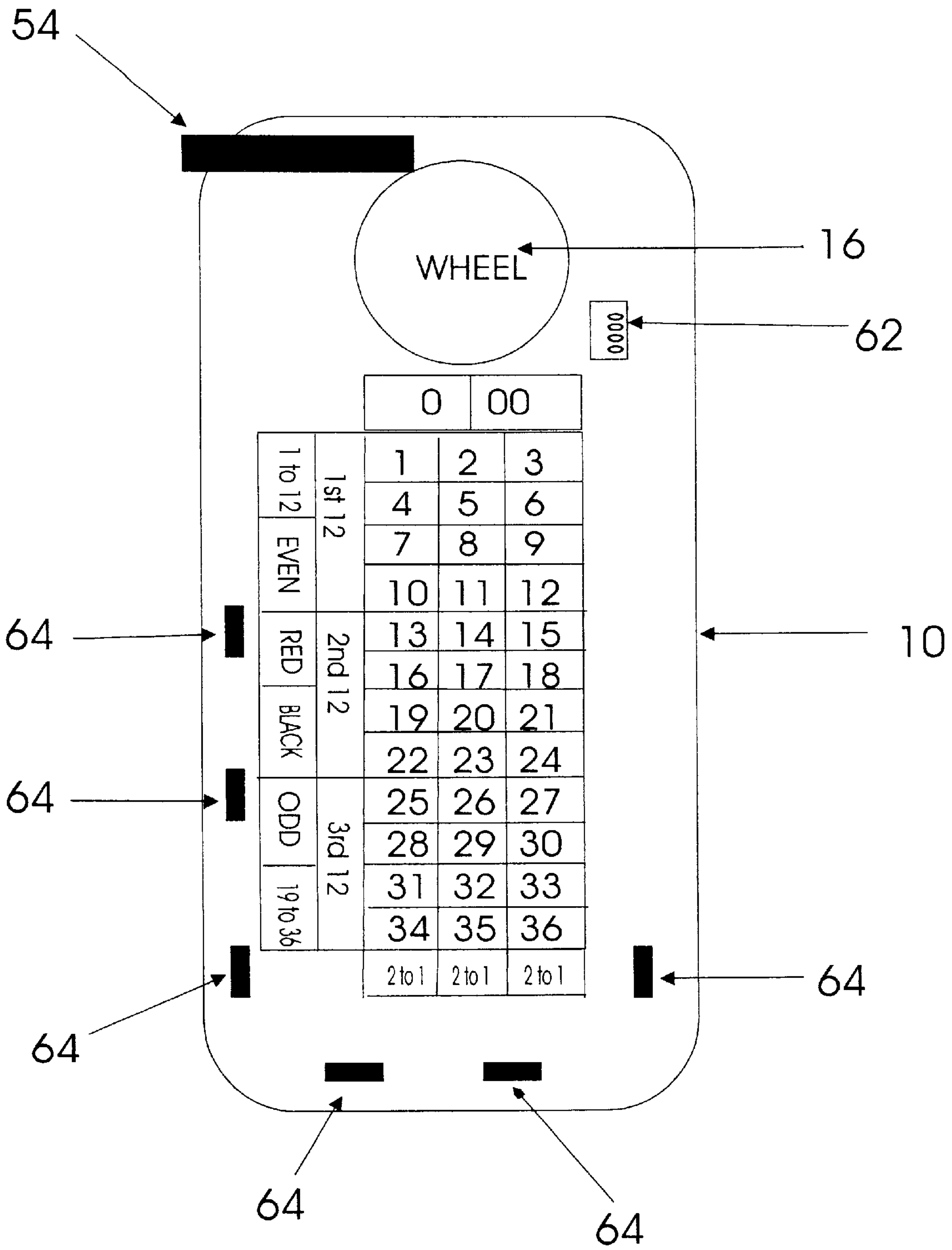
Figure 2:
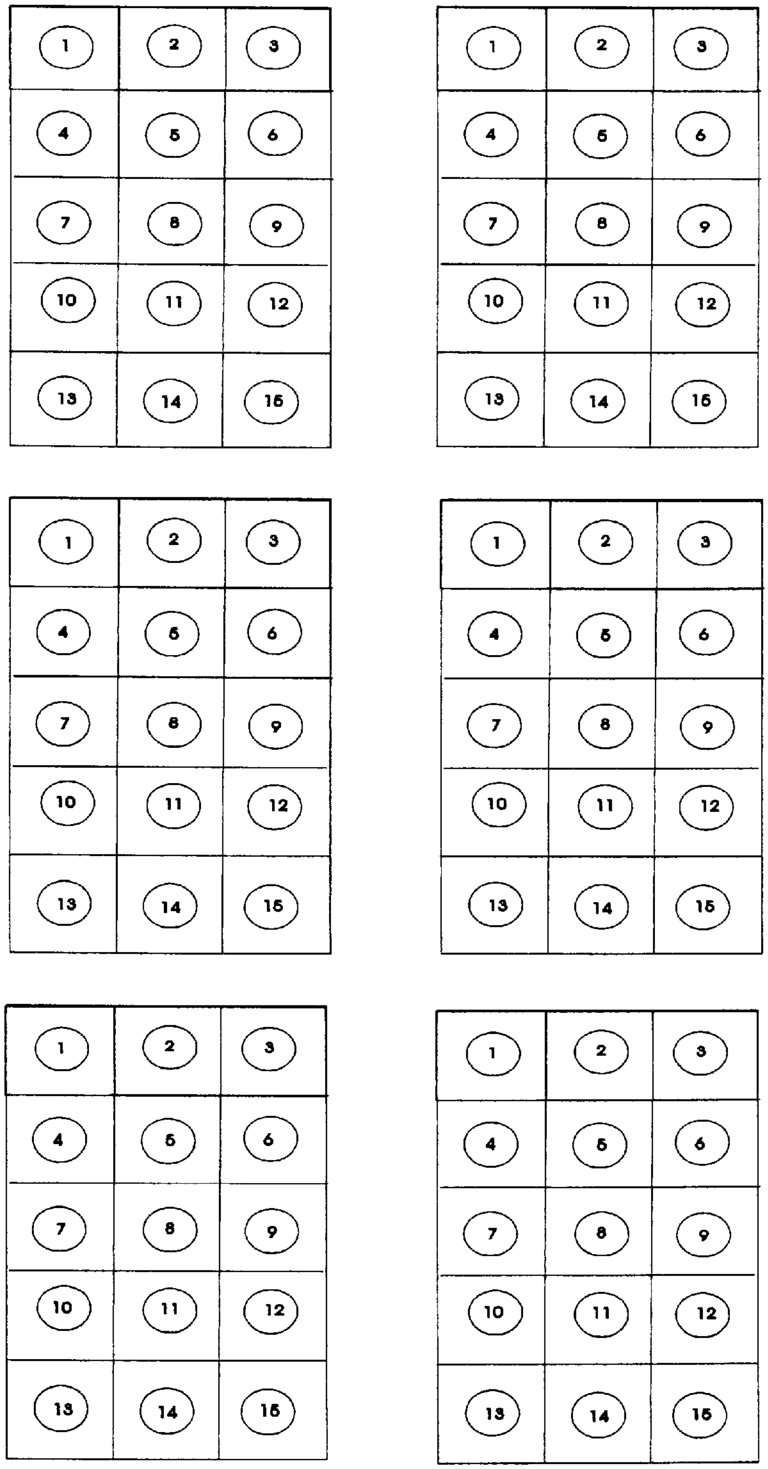
FIG. 2 shows examples of the game layouts.
Figure 2A:
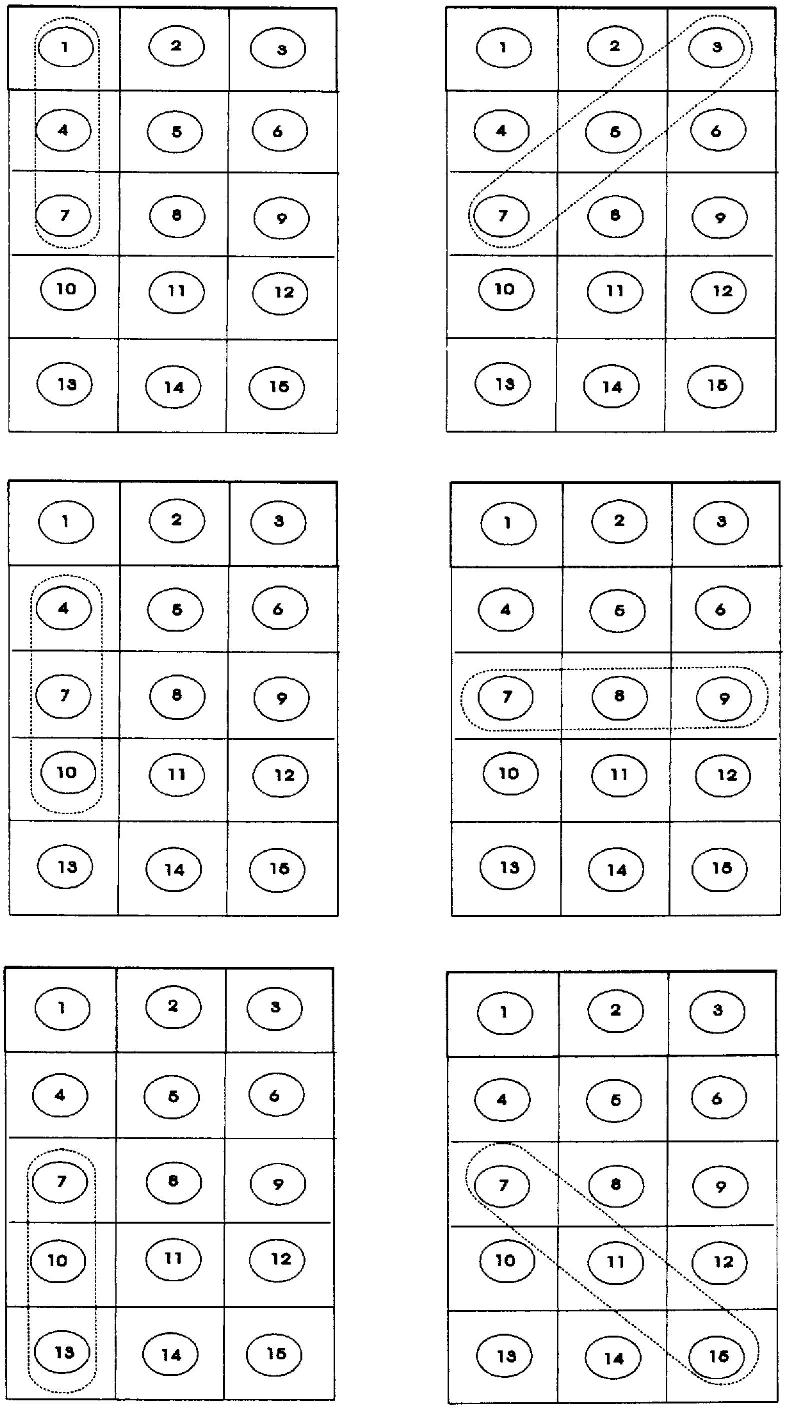
Figure 2B:
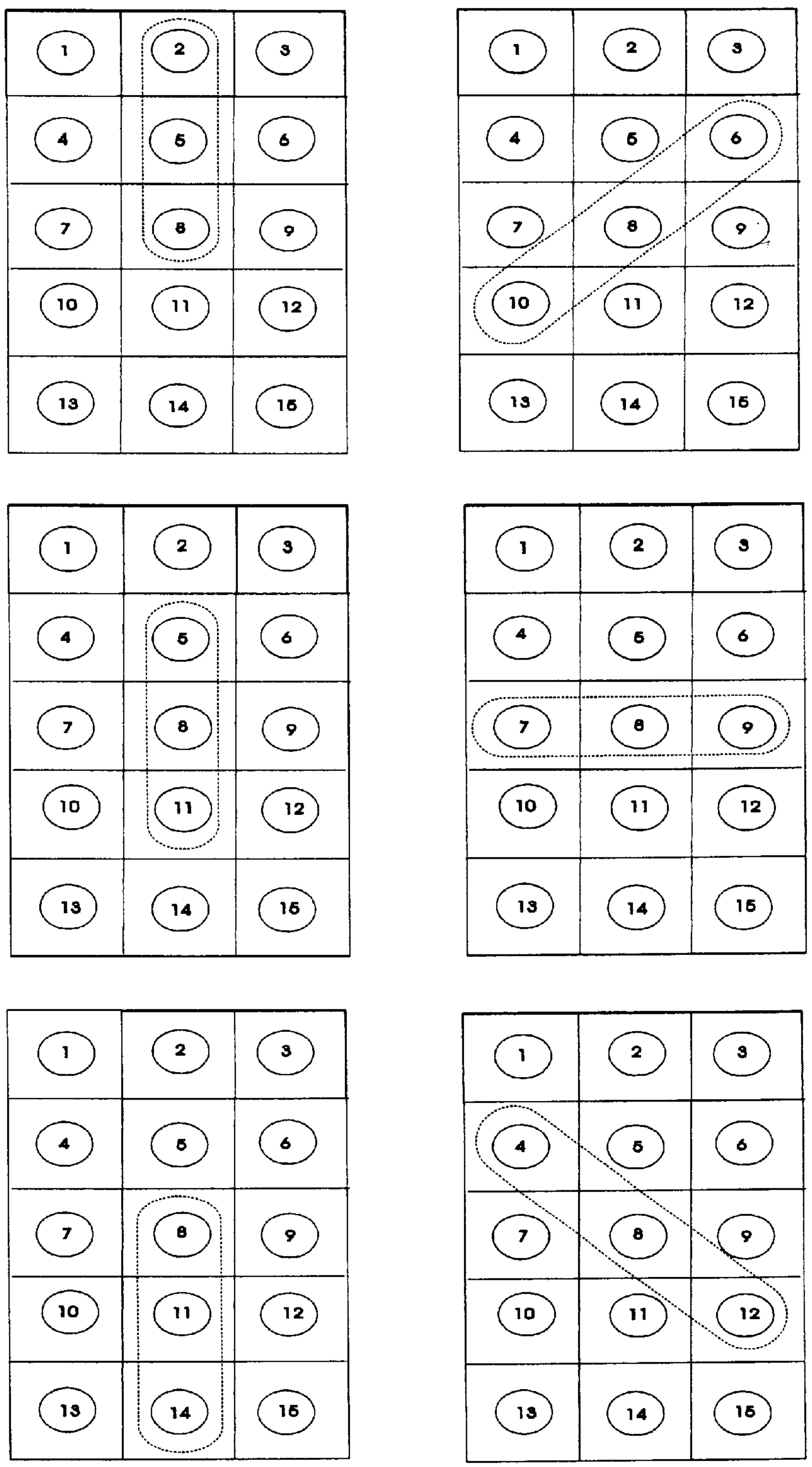
Figure 2C:
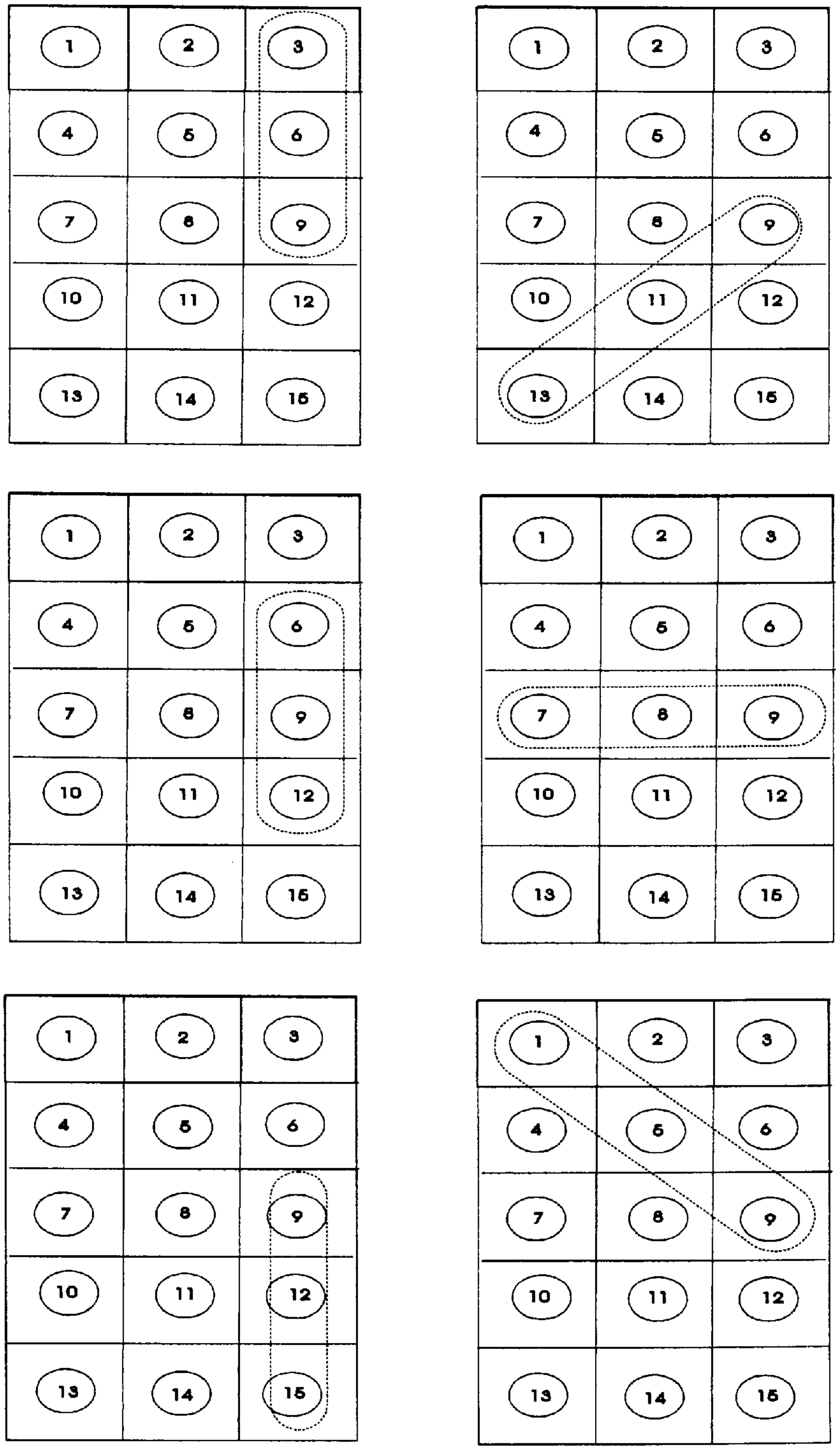
Figure 2D:
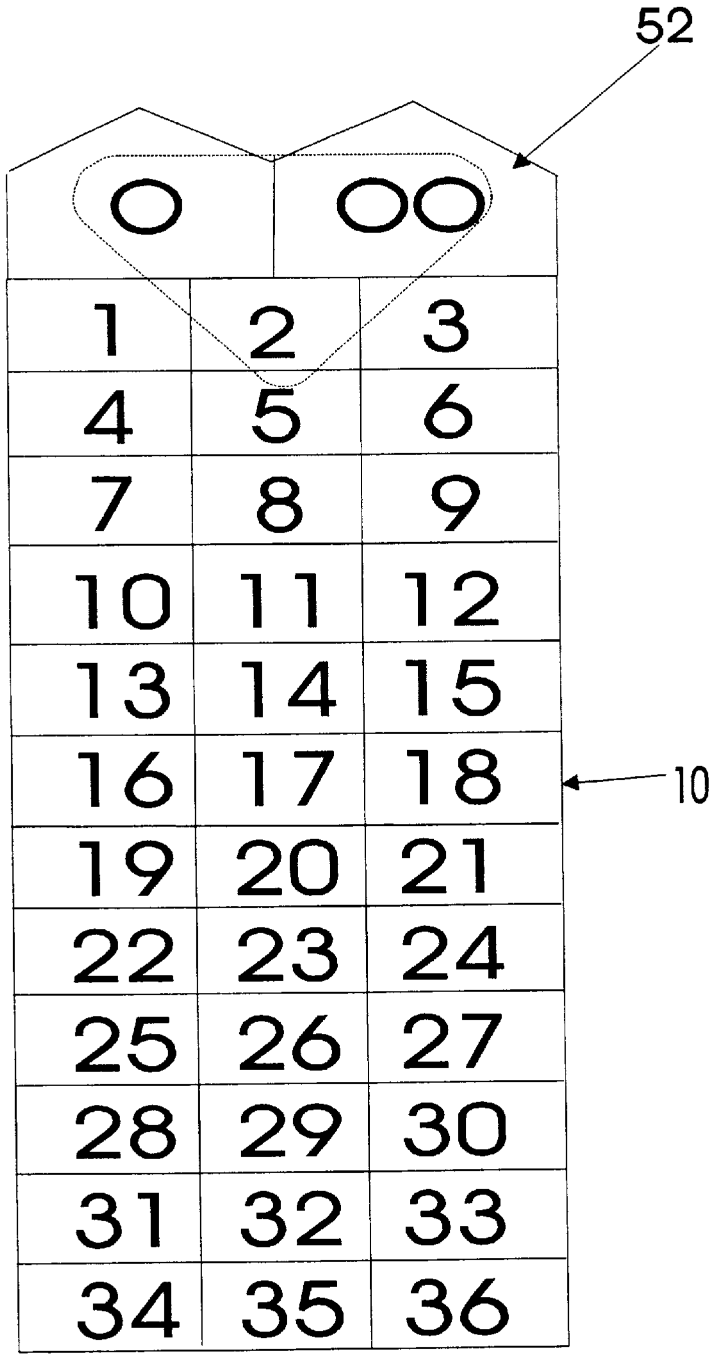
Figure 3:
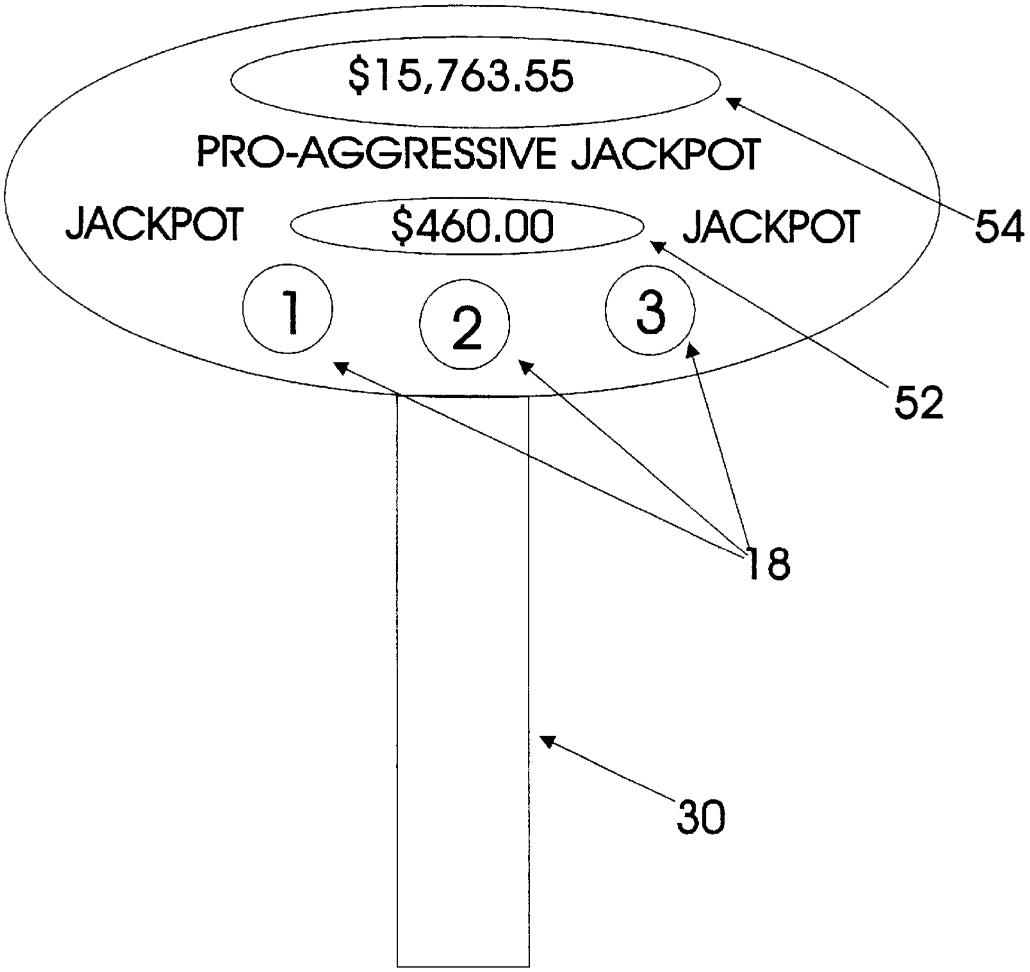
Figure 4:
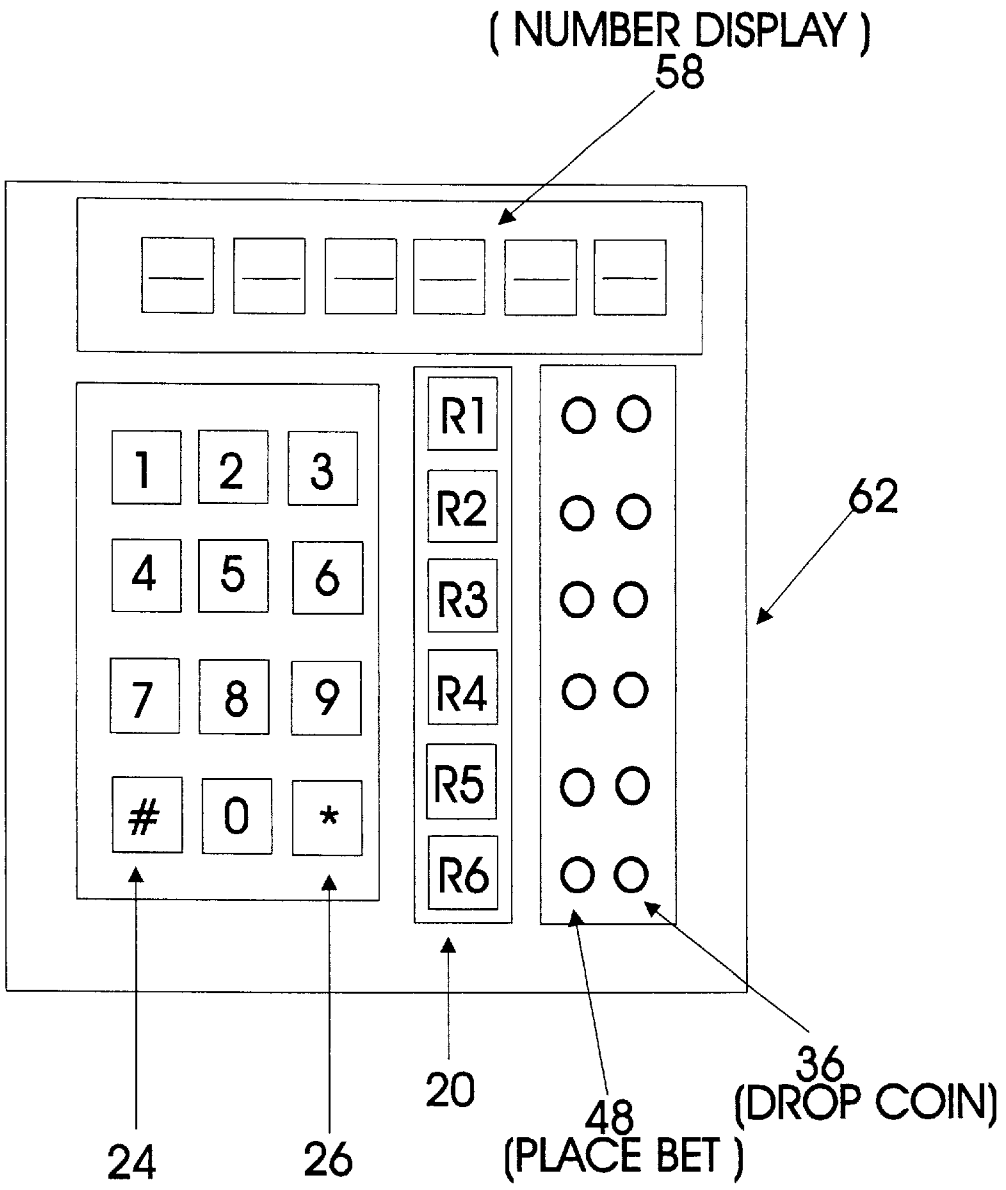
Figure 5:
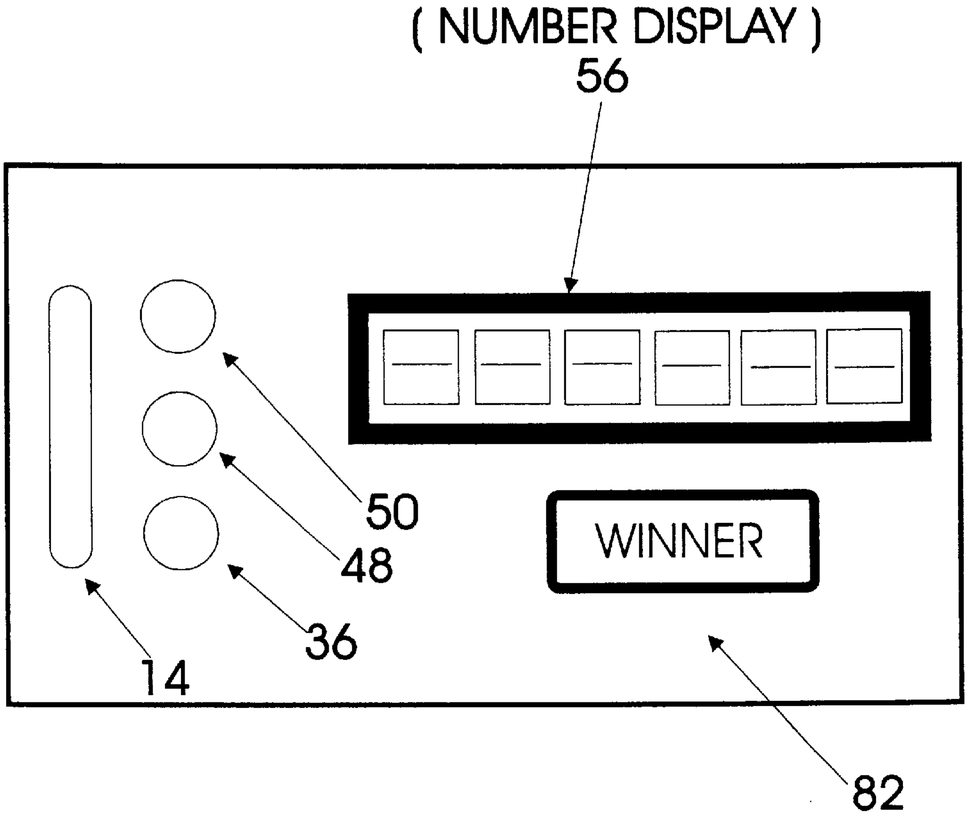
Figure 6:
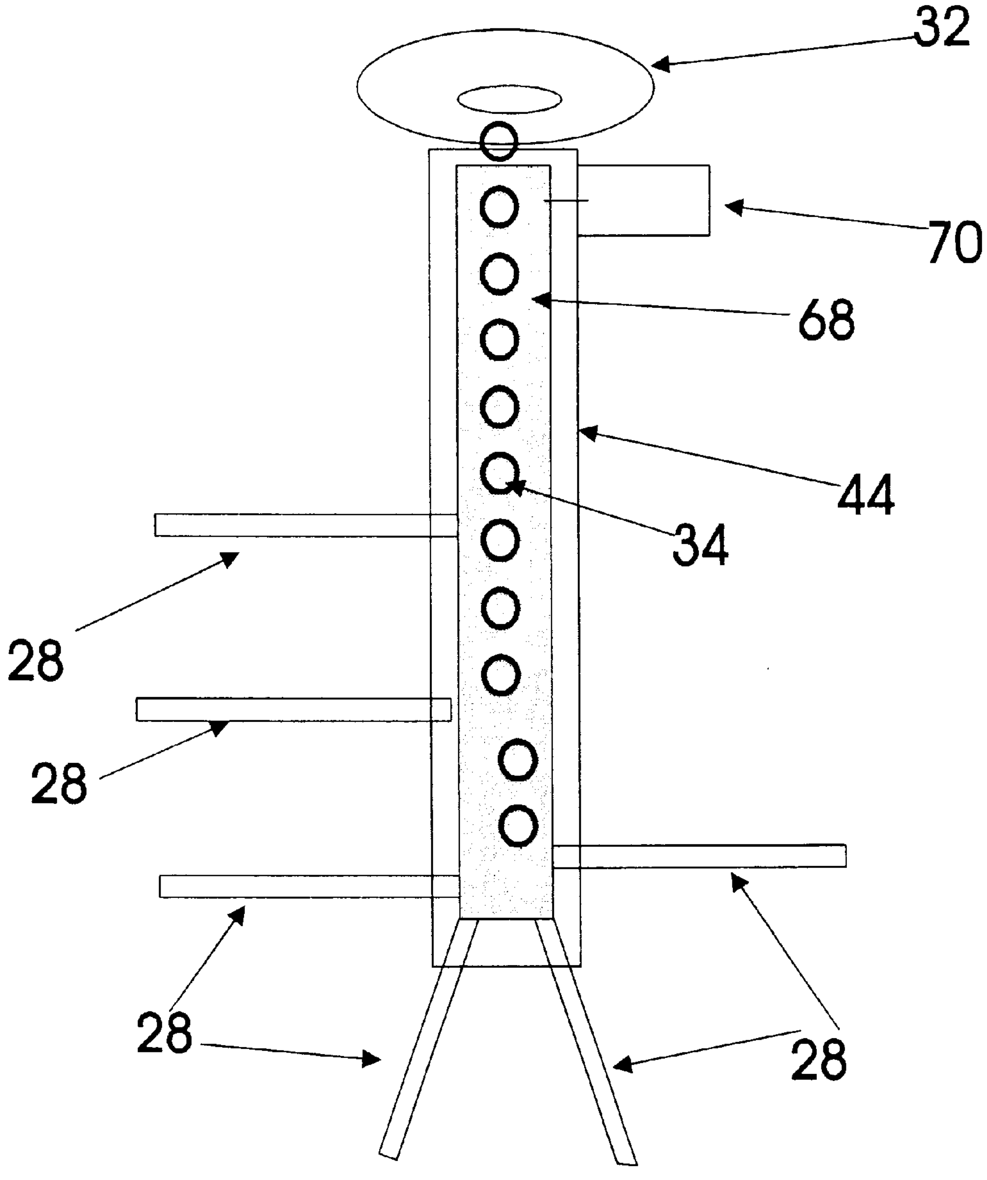
Figure 7:
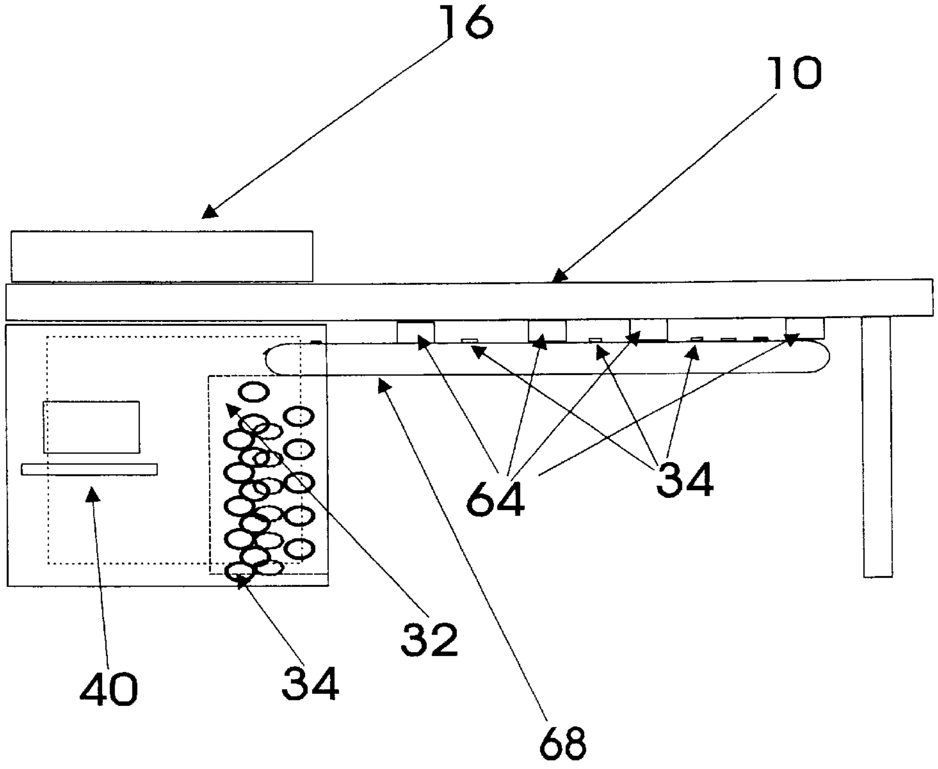
Figure 8:
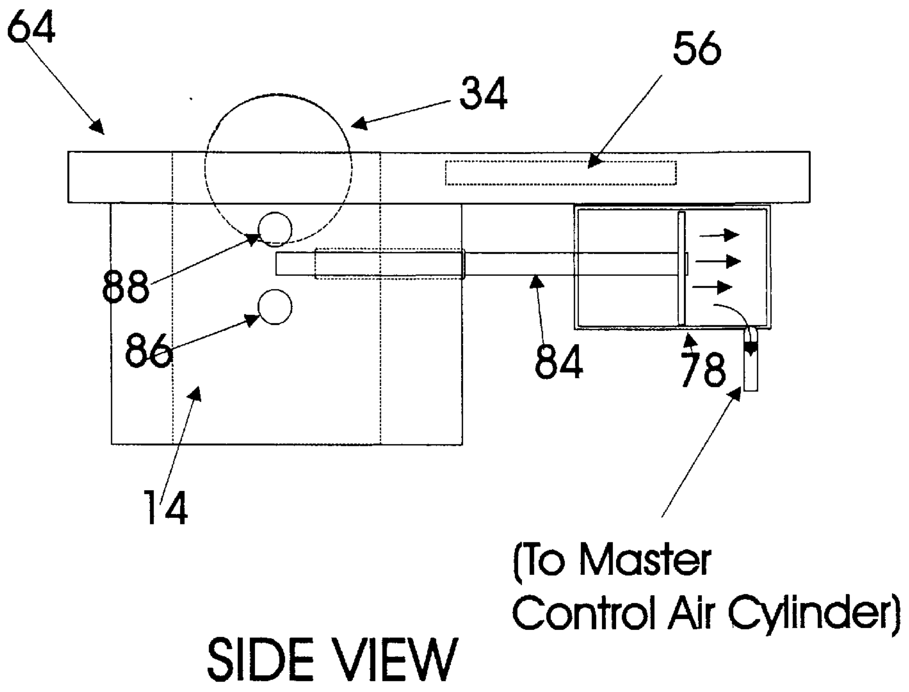
Figure 9:
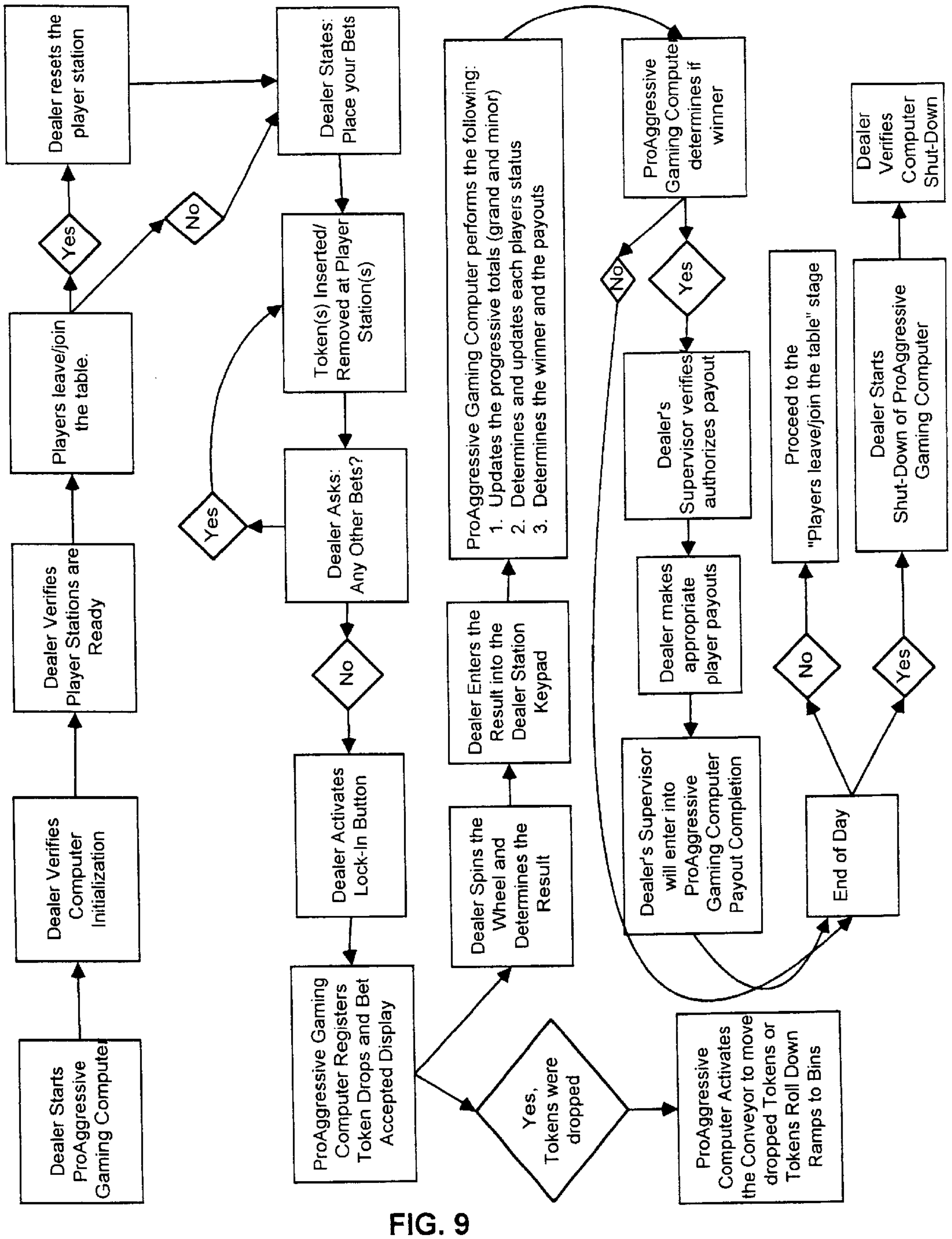

FIGS. 2*a*, 2*b*, and 2*c* describes the possible winning combinations if the first result was 7, 8, and 9 respectively. FIG. 2*d* shows a typical game layout depicting the only combination to win the main Pro-Aggressive Jackpot.

FIG. #3—a view of the progressive jackpot tower depicting the progressive jackpot and the three consecutive numbers of the winning jackpot. It also depicts the Pro-Aggressive Jackpot.

FIG. #4—is a top view of the dealers control panel. On the panel, there is a numeric key pad with two of the buttons used for a lock-in button and an enter spin result button. It also contains reset buttons for each player station. There is also a numeric display for a winning combination when one occurs and LED's which will display which players have placed bets or which stations have dropped coins.

FIG. #5—is a top view of a player control panel. On the panel, there are three optional displays to inform the security cameras of the stations current status. The Green LED indicates the player station is ready for use, the Amber LED indicated the player has a token ready to bet in the upcoming spin, and the Red LED to show the player that his token has been accepted and registered by the computer. There is also a numeric display to show the player which numbers are currently held or a winning message (and a provisional win light).

FIG. #6—a view of the coin alley way to the hopper and a typical drawing of a conveyor belt and motor assembly used to move coin or tokens to a drop box.

FIG. #7—will show a side view of the game cut out for depiction of a drop box, computer controller and conveyor system.

FIG. #8—depicts a side view of the player control panel. It details the coin acceptor with its two Infra-red sensors along with the air cylinder, air cylinder plunger and connecting vacuum line.

FIG. #9—is a logical flowchart depicting the course of events for the game.

FIG. #10—is a summarized legend for preceding figures.

DETAILED DESCRIPTION OF THE SPECIFIC EMBODIMENTS

There are a few manners in which the two progressives can be started. The standard way of establishing the progressive would be for the casino to seed the progressive with a pre-determined amount. The progressive would continue to grow until the progressive is won and re-seeded, or until the game is closed out. An alternative would be to use a daily progressive for either jackpot, where the minor or major jackpot is reset daily. The percentage growth of each progressive is to be determined by the casino. We also offer the option to connect multiple tables together for a casino-wide progressive, or in any fashion the casino so desires which could make the progressive state, national, or global.

Let us first examine how a player can win the minor progressive jackpot. The key to understanding the winning combinations, listed in FIGS. 2*a*–2*c*, is every player must win in a three spin set or their play restarts keeping the last spin's result. The players will sit at the table and place their tokens into their player control panels 64 during the betting stage of the roulette game. As each player places a token into their slot the top infra-red sensor 88 will turn off the player control panel ready light (Green LED, 50) and turn on the player control panel bet placed light (Amber LED, 48). Should the player change his mind before the tokens are dropped by the dealer, the opposite process will occur (Amber LED off, and Green LED on). The player may also ask the dealer to reset his station if he desires. The player need only concentrate on his or her bet as if he or she were playing the regular roulette-game. The progressive game does not interfere with the game of roulette in any fashion. After the coin is accepted, the computer 40 is programmed to do all assigning of numbers and jackpot to the player. The dealer would then depress the appropriate reset button 20 for the player. The dealer asks all of the players at the table if they have placed all bets. Upon affirmative confirmation from all participants the dealer will depress the wager lock-in button 24. The wager lock-in button tells the computer to activate the air solenoids 78 at each player control panel. All of the players tokens will drop through the slots in their player control panel and pass the second infra-red sensor 86 in each player control panel. The second sensor will tell the computer which players have placed a bet for this spin. The computer will change the player control panel token dropped light on (Red LED, 36) and the player control panel placed bet light off. The dealer will spin the wheel and the ball in opposite directions and await the result. After the result is determined the dealer will enter the location of the ball into the dealer control panel 62. The computer will now handle the necessary calculations and tracking for each player.

If this is their first play for the progressive, the player will see the result of the spin appear in the player control panel LED display 56 in the left two digits. This is the first number of the player's set. If the player does not place a bet on the next spin, the player's control panel will reset and he will have to begin again.

If this is their second play for the progressive, the result of the spin must contribute to the player's win in a progressive. For example if the first number the player received on the first spin was a seven (FIG. #*2a*) you can see the result of the second spin must be 1, 4, 10, 13, 5, 3, 8, 9, 11, 15 in order for the second spin's result to appear in the player control panel LED display 56 in the right two digits. If the second number is not 1, 4, 10, 13, 5, 3, 8, 9, 11, 15 then the result of the second spin becomes the player's first number in the set. In other words, it would be as if the player had not placed his first progressive bet, and the result of the second spin was his first. To further illustrate the different types of winning combinations FIG. #*2b* would be if the first number was an eight, and FIG. #*2c* would be if the first number was a nine.

If this is their third play for the progressive (for instance the player has on his display a 7 and a 4), you can see the player needs either a 1 or a 10 to win the minor jackpot. If the third number is not 1 or 10 then the result of the third spin becomes the player's first number in the set. In other words, it would be as if the player had not placed his first or second progressive bets, and the result of the third spin was his first. If the third number is a 1 or a 10 then the player wins the minor jackpot. For each player who wins the minor progressive their player control panel will display "WINNER" 56 or the provisional win light/display will activate.

Before we describe the winning process, we will look at winning the major progressive. The major progressive is awarded if the player has bet three consecutive spins and the results of the spins are 0, 00, 2 in any order. It is worth noting that if the first spin's result is a 2 then the player has the possibility of winning, either the minor or major progressive. If the first spin results in 0 or 00 then the only possibility for winning is the major progressive. Should any player win either progressive, the dealer's control panel will display the winning combination and each player's control panel will display the winning combination in addition to the provision for a win light. The dealer's supervisor will be informed of the winning combination and will use the computer 40 to review the winning sequence. Upon verification of the winning combination with security the dealer will make all payouts. The payout amount will be the progressive total divided by the number of players with a winning combination rounded up to the nearest whole dollar. After the payouts are made, the dealer's supervisor will enter a code into the computer to reset the progressive and allow the dealer to resume play. After the progressive win, if there is one, the dealer will again ask for wagers and play will continue in this manner until another win takes place or the game is closed for the night. The computer will be setup to record the progressive totals to begin the next session when the game resumes.

From a physical standpoint, our invention begins action when the dealer depresses the lock-in bets button 24 on the dealer control panel 62. This causes the computer to activate the coin drop sensor circuitry 86, after which it will activate the master solenoid control air cylinder 90. The master solenoid control air cylinder is connected via a 1 to 6 vacuum line splitter 92 to the six vacuum lines 80 attached to each player control panel's slave air cylinder 78. After a small delay the computer will reverse the master solenoid control air cylinder and likewise prepare each station to again accept bets. The computer will also start the conveyor which will run for a set period of time if any tokens were detected dropping. Because the slave air cylinder is directly connected to the air cylinder plunger 84, the tokens will drop through the coin acceptor slot 14 into the token alleyway. The token alleyway has down angle which allows gravity to roll the coin towards the conveyor 44. The tokens are carried on the conveyor until they fall into the Pro-Aggressive drop box 32. Another alternative would be to have the alleyways to connect directly to the hopper. It is important to point out that this is a depiction of an example as to how the player stations will work. The player station, in concept, must only perform two things: hold the token in a visible location until the dealer is ready and inform the computer that a token has been accepted.

The computer will add the pre-determined set percentage to the progressive for each token detected during the drop. The amount of the Progressive Jackpot or the Pro-Aggressive Jackpot will be indicated on the meter board 30. The writing of software to implement the additional game features should be a matter of routine and will be copyrighted. The progressive jackpot is programmed to increase a specified percentage of the amount wagered as it passes through the coin acceptor slot 14 and light sensor 86. About 5% to 8% will be added to the jackpot at every spin of the wheel when the progressive wagering is in progress.

With respect to the game we have the following optional features the casinos can choose from.

We also offer the option for our game to reset the player's control panel completely should the second or third number not be a winning number in the player's set as defined by the player's first number. This will allow us the variation of having the player start over with no numbers on their player control panel if the second or third numbers are not a winning combination.

We also offer the option for our game to use an evolving set in order to win the progressive. This evolving could be limited to either the first, second, or both the first and second numbers stored on the display in the player's control panel. This schema is a bit more complex because the computer must decide if any of the player's previous numbers could apply towards a win with the third spin's result. An example to illustrate this concept is as follows. A player on his first bet receives the number 4 as a result of the first spin, and a 1 as a result of the second spin. According to the standard rules the player would reset to the result of the third spin unless the result is a 7, in which case the player would win. With the variation of checking the first result however, the player would keep the 1 if the third result is a 2, 3, 5, or 9. With the variation of checking the second result however, the player would keep the 4 if the third result is a 5, 6, 8, 12, or 10; With the variation of checking the first and second results however, the player would keep the 1 if the third result is a 2, 3, 5, or 9, otherwise the player would keep the 4 if the third result is a 5, 6, 8, 12, or 10.

We also offer the option for our game to allow as an acceptable winning combination a "wrap-around" effect on either the top and bottom, or left and right. An example of a winning combination would be 31, 34, and 1.

We also offer the option for our game to in part or in full allow single color combinations. An example of a winning combination would be 6, 8, and 10 for black, or 3, 5, and 7 for red.

We also offer the option for our game to have the individual to "buy" the first number. This can be illustrated by the following example. A player arrives at the table and sees the result of the previous spin is 13, his favorite number. He informs the dealer that 13 is his favorite number and that he would like to "buy" that number for his player control panel. The dealer would then use the computer to add the previous result to the players control panel.

What is claimed is:

1. A method of playing and wagering a live roulette game using a standard roulette wheel and a standard roulette table layout wherein the table layout having thereon a plurality of numbers corresponding to an identical numbered indicia group on a roulette wheel and an additional position for wagering and receiving a pro-aggressive jackpot comprising the steps of;

(a) placing a wager, by each player on the surface of a live roulette game table to participate in a pro-aggressive jackpot portion of roulette;

(b) inserting a first token or chip in a coin acceptor gate to receive a firt number of three in a line or three in a row sequentially to win a pro-aggressive jackpot;

(c) inserting a second token or chip in a coin acceptor gate to receive a second number of three in a row or three in a line sequentially to win a pro-aggressive jackpot gate, (d) inserting a third token or chip in a coin acceptor gate to receive the a third number of three in a row or three in a line sequentially to win a pro-aggressive jackpot, and (e) accumulating a pro-aggressive jackpot account fund from a portion of said wagers.

2. The method of claim 1, further comprising the steps of:

activating a timed counting cycle, by a start button located at the main control panel, to visually spin and display a random number associated with the indicia of the numbered roulette table layout;

detecting a winning three number combination, calculating a pay out of an accumulated amount of a jackpot condition; and reset to a set jackpot amount by means of a pre-set jackpot amount or accumulated jackpot amount.

3. The method of claim 1, further comprising the steps of:

activating a token return button; and using a conveyor system to receive and recycle the coin accepted drop from the wagering positions back to the dealer position for continuous play.

4. The method of claim 1 further comprising the steps of:

using a conveyor system to receive and recycle coin accepted drop from the wagering positions back to the dealer position for continuous play by a pre programmed automatic function token return.

5. The method of claim 1 wherein the roulette game having two pro-aggressive jackpots that can only be won by placing a wager three times in a row consecutively and resulted in by:

a. catching three numbers from three spins in a row touching each other, or b. catching three numbers horizontally, vertically or diagonally touching each other.

* * * * *